United States Patent [19]
Chang et al.

[11] Patent Number: 5,268,840
[45] Date of Patent: Dec. 7, 1993

[54] METHOD AND SYSTEM FOR MORPHOLOGIZING TEXT

[75] Inventors: David Chang, Tainan City; Bing-hwang Lee, Taipei; Jian-ming Tsaur, I Lan Hsiang; Huan-chan Lin, Taipei, all of Taiwan

[73] Assignee: Industrial Technology Research Institute, Hsinchu, Taiwan

[21] Appl. No.: 876,665

[22] Filed: Apr. 30, 1992

[51] Int. Cl.$^5$ .......................... G06F 15/38; G06F 1/00
[52] U.S. Cl. .................... 364/419.08; 364/DIG. 1; 364/DIG. 2
[58] Field of Search ............... 364/419, 200 MS File, 364/900 MS File

[56] References Cited

U.S. PATENT DOCUMENTS

| | | | |
|---|---|---|---|
| 4,887,212 | 12/1989 | Zamora et al. | 364/419 |
| 5,109,509 | 4/1992 | Katayama et al. | 395/600 |

Primary Examiner—Roy N. Envall, Jr.
Assistant Examiner—Frantzy Poinvil
Attorney, Agent, or Firm—Meltzer, Lippe, Goldstein et al.

[57] ABSTRACT

A method and system for morphologizing written or printed texts, including Japanese texts are obtained in accordance to codes. The longest morphemes are divided one at a time from the characters in a sentence. This is achieved by forming the longest morpheme from the remaining characters in the sentence which is listed in a dictionary of valid morphemes and determining if it is conjunctive with the previously divided morpheme. To determine if a formed morpheme is conjunctive, associated pairs of front and back connection codes are retrieved. If a front connection code of one retrieved pair and a back connection code of a pair of connection codes of the previously divided morpheme are co-listed in a table of permissible relationships, the formed morpheme is conjunctive. If no character may be divided from the remaining characters in the sentence, a previously divided morpheme is redivided. If a morpheme can be divided and is conjunctive with the previous morpheme, a connection action, describing the relationship between the formed morpheme and the previously divided morpheme, is recorded. In response to certain connection actions, the next morpheme is divided by forming it from a single character of the remaining characters and testing it. After all of the morphemes are divided, a word graph is constructed from the morphemes in accordance with the connection actions relating adjacent morphemes.

10 Claims, 10 Drawing Sheets

FIG. 4

|BACK CONNECTION CODE|FRONT CONNECTION CODE|CONNECTION ACTION CODE|
|---|---|---|
|1|195|10|
|1|196|10|
|.|.|.|
|2|199|40|
|2|95|10|
|.|.|.|
|54|2|11|
|.|.|.|
|127|196|53|
|128|1|54|
|128|83|54|
|.|.|.|
|135|203|22|
|136|112|21|
|.|.|.|
|164|125|44|
|164|195|43|
|164|196|48|
|.|.|.|
|223|195|2|
|224|1|4|
|224|120|3|
|.|.|.|
|293|192|30|
|293|246|30|
|297|196|10|

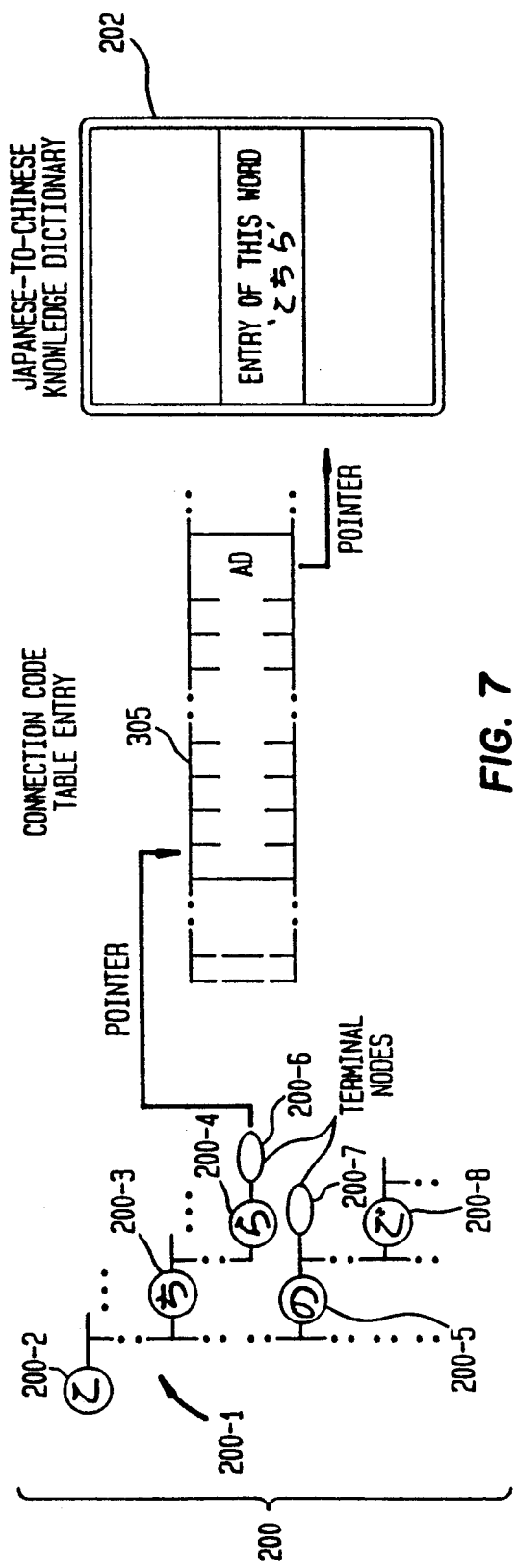
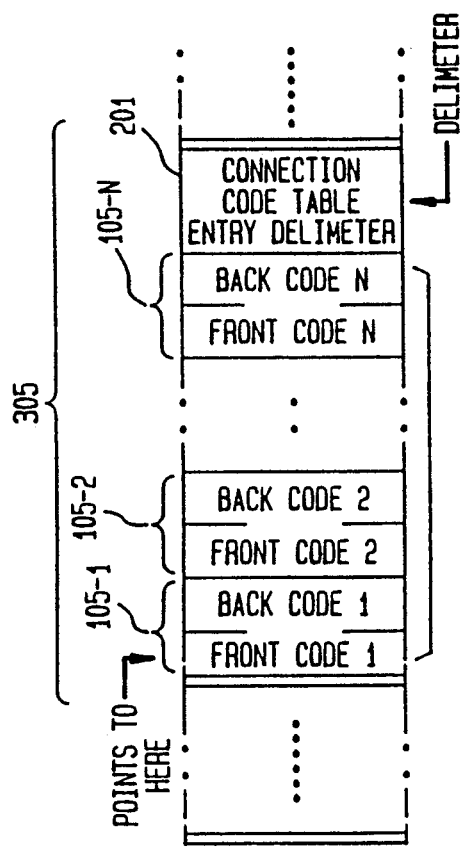
FIG. 6
FIG. 7

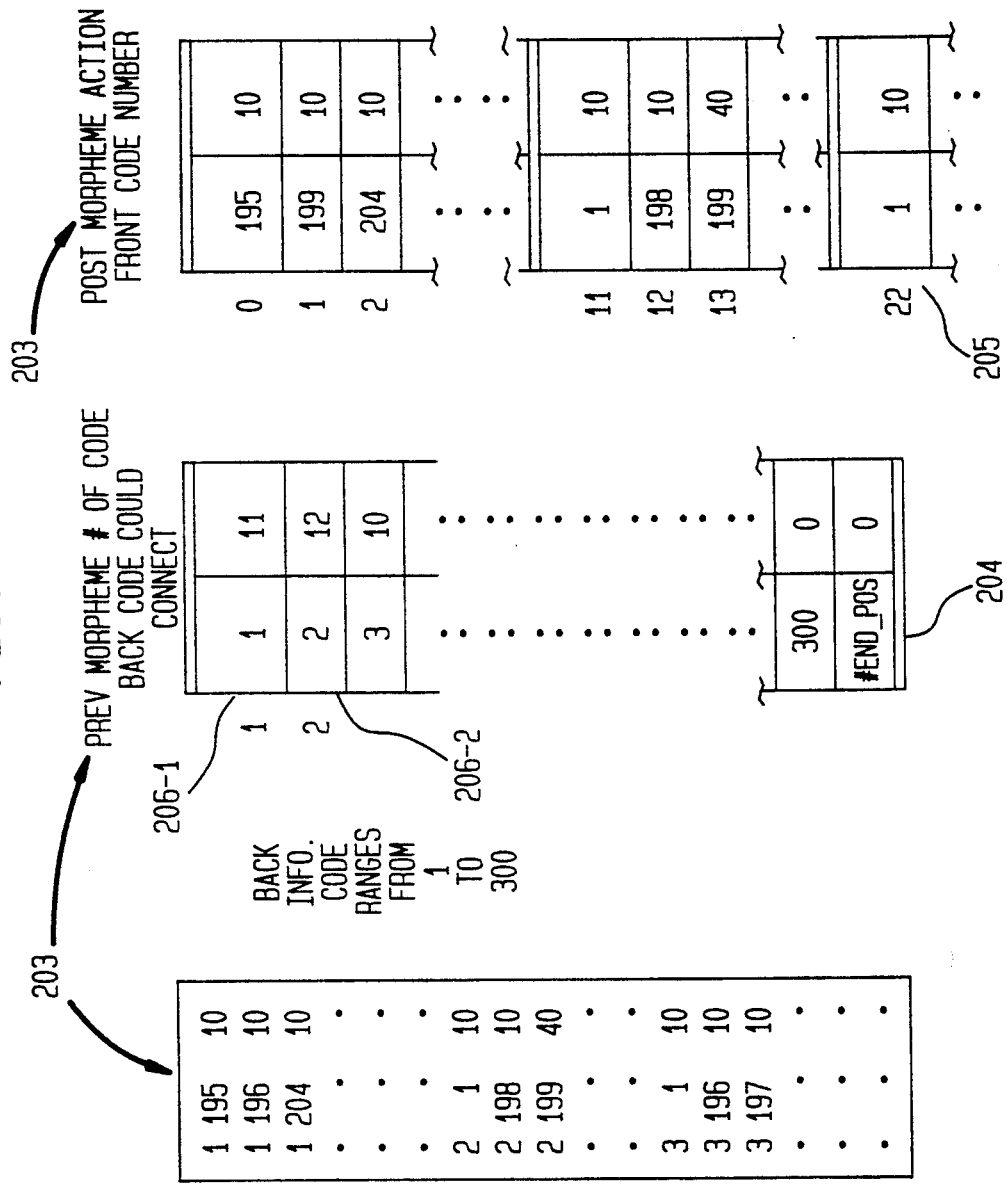

FIG. 9

ACTION 1-9: VERB CONJUGATION FORM

ACTION 10: SEPARATE THE WORDS APART

ACTION 11: DELETE SUFFIX

ACTION 20: DELETE PREVIOUS STRING, OR PREFIX

ACTION 21-29: 5-ROW VERB, UPPER-ROW, LOWER-ROW VERB, ADJECTIVE AND ADJECTIVE VERB CONJUGATION.

ACTION 30: STANDS FOR THE RELATIONSHIP BETWEEN STEM AND LEAF.

ACTION 31-39: POSSIBLE VERB CONJUGATION.

ACTION 40: STANDS FOR A WORD BEING FOLLOWING WITH A STEM. IF THE BACK CONNECTION CODE OF THE STEM IS 124' 131' 141-149' 152' 169' LOOK-FORWARD WILL BE ENABLED.

ACTION 41-49: NOUN VERBALIZATION

ACTION 51-59: NOUN ADJECTIVE-VERBALIZATION

FIG. 10

| MORPHEME # | STEPS | MORPHEMES | CONNECTION CODE PAIR | CONNECTION ACTION CODES | REST STRING |
|---|---|---|---|---|---|
| 1 | 100 | < | ( 2  269) | | |
| | 102 | 今 | | | 後販売する商品数も増やしていく。 |
| | 102 | 今後 | | | 販売する商品数も増やしていく。 |
| | 104 | 今後 | ( 1  54 ) | | 販売する商品数も増やしていく。 |
| 2 | 106, 109-114 | 今後 | ( 1  54 ) | 10 | 販売する商品数も増やしていく。 |
| | 102 | 販 | | | 売する商品数も増やしていく。 |
| | 102 | 販売 | | | する商品数も増やしていく。 |
| | 104 | 販売 | ( 1  74 ) | | する商品数も増やしていく。 |
| 3 | 106, 109-114 | 販売 | ( 1  74 ) | 10 | する商品数も増やしていく。 |
| | 102 | す | | | る商品数も増やしていく。 |
| | 102 | する | | | 商品数も増やしていく。 |
| | 104 | する | (205  164) | | 商品数も増やしていく。 |
| 4 | 106, 109-114 | する | (205  164) | 30 | 商品数も増やしていく。 |
| | 102 | 商 | | | 品数も増やしていく。 |
| | 102 | 商品 | | | 数も増やしていく。 |
| | 104 | 商品 | ( 1  54 ) | | 数も増やしていく。 |
| 5 | 106, 109-114 | 商品 | ( 1  54 ) | 44 | 数も増やしていく。 |
| | ⋮ | ⋮ | ⋮ | ⋮ | ⋮ |
| 8 | 106, 109-114 | 増や | (199  148) | 40 | していく。 |
| | 116 | し | | | ていく。 |
| | 104 | し | (142  137) | | ていく。 |
| 9 | 106, 109-114 | し | (142  137) | 30 | ていく。 |

FIG. 11

| MORPHEME # | MORPHEME | CONNECTION ACTION CODE | CONNECTION CODE PAIR |
|---|---|---|---|
| 1 | < |  | ( 2 269) |
| 2 | 今後 | 10 | ( 1 54 ) |
| 3 | 販売 | 10 | ( 1 74 ) |
| 4 | する | 30 | (205 164) |
| 5 | 商品 | 44 | ( 1 54 ) |
| 6 | 数 | 10 | ( 1 54 ) |
| 7 | も | 10 | ( 95 45) |
| 8 | 増や | 40 | (199 148) |
| 9 | し | 30 | (142 137) |
| 10 | ていく | 22 | ( 48 138) |
| 11 | 。 | 23 | (196 1) |
| 12 | > | 10 | ( 2 269) |

FIG. 12

| MORPHEME # | MORPHEME | ROLE | RELATIONSHIP |
|---|---|---|---|
| 1 | < | BEGINNING | |
| 2 | 今後 | NOUN | |
| 3 | 販売 | VERB | |
| 4 | 商品 | NOUN | |
| 5 | 数 | NOUN | |
| 6 | も | AUXILARY | |
| 7 | 増や | VERB | COMBINATION |
| 8 | ていく | | COMBINATION |
| 9 | 。 | PERIOD | |
| 10 | > | END | |

METHOD AND SYSTEM FOR MORPHOLOGIZING TEXT

FIELD OF THE INVENTION

The present invention relates to character recognition and more particularly to a method and system for segmenting written or printed texts into morphemes.

BACKGROUND OF THE INVENTION

FIG. 1 depicts an optical character recognition system (OCR) 10 having an optical scanner 12 connected to a data processing system 14. The optical scanner 12 scans a written or printed page of text and reads the individual characters printed or written thereon. Typically, the scanner 12 is capable of recognizing any character from a predefined set and returning a symbolic representation, associated with each scanned character. These codes are fed to the data processing system 14 for further processing.

The data processing system 14 shown in FIG. 1 comprises a CPU 16 interconnected to a main memory 18 via a bus 20. Also connected to the bus 20 are a disk memory 22 and an I/O interface 24. The I/O interface 24 is connected to the optical scanner 12. In this manner, the data processing system 14 may receive the characters read in by the optical scanner 12 via the I/O interface 24.

Frequently, it is desired to process printed text. The text itself may be scanned by the OCR system to extract the individual characters. From there, the symbolic representations of each character are transmitted to the data processing system for further processing in accordance with a desired application such as translating the written text to another language or interpreting the written text.

Occasionally it is desirable to morphologize the text or to segment the words of the text into morphemes and then relate each morpheme to one another. A morpheme is an indivisible word fragment which can convey meaning. For instance, the word "gun" is a morpheme. It conveys a certain meaning to the reader and cannot be divided into a smaller unit and still convey the same meaning. The word "guns," on the other hand, has two morphemes "gun" and "s." The first morpheme conveys the same meaning as before. But, by placing the second morpheme "s" adjacent to the first morpheme, the sense of plurality is conveyed. Many morphemes may be placed into a single word to convey a more complicated meaning. For instance, the word "gunfighter" contains three morphemes "gun," "fight" and "er."

As can be seen above, some morphemes can stand alone as words such as "gun" and "fight." Others are word fragments and cannot stand alone such as "s" and "ing." Still, others appear to be composed of further divisible units such as "together" or the phrase "in order to". However, these phrases and words, are also morphemes as they cannot be further divided without drastically changing their meaning.

In the English language it is often a simple task to determine where a particular word begins and ends simply by using the "space" character as a word delimiter. This is not so simple in other languages such as Japanese, Chinese or Korean. Each character within a sentence is chosen from a large set and is approximately evenly spaced in relation to the other characters. Further, the placement of one character in a sentence may drastically alter the way characters are parsed by the reader into words. Nonetheless, these texts exhibit morpheme properties. Characters alone, or strings of characters, form indivisible units or morphemes which convey a particular meaning. Again, the morpheme may be a whole phrase, word, word fragment or semantic unit which merely conveys information regarding another morpheme.

The goal of morphology is to segment a text into morphemes and then relate the morphemes to one another. Several morphology methods have been previously disclosed (see, e.g., Japanese Pat. No. 61-210479, Japanese Pat. No. 60-20234).

Certain languages, such as Japanese, have a structured grammar in which two adjacent morphemes must obey certain rules of connection. These rules dictate whether two morphemes may be placed adjacent to one another. Two prior morphology methods have exploited the connection relationship between morphemes in the Japanese language. A first approach, called Longest Match, segments the sentence of characters or divides the sentence into morphemes, one at a time. Initially, the parser attempts to string together the longest series of characters, starting from the beginning of the sentence, which is listed in a Japanese dictionary as a recognizable morpheme. It is then determined whether this morpheme may be connected to the beginning of the sentence. If this morpheme cannot be the first morpheme in the sentence, (i.e., the above-generated morpheme is not conjunctive with the beginning of the sentence) the parser returns to the step in which the longest morpheme was formed. Then, the second longest morpheme is formed and then tested in the above manner.

After the first morpheme is divided, a second morpheme is divided in a similar manner. The longest possible morpheme is formed from the remaining characters of the sentence starting with the character following where the first morpheme left off. The second morpheme so formed is tested to determine if it is conjunctive with the first morpheme. If the two morphemes are not conjunctive, the second morpheme is reformulated, as described above, i.e. the second morpheme is formed from the next to longest string of characters remaining in the sentence and tested. It may be appreciated that reformulation may occur for any morpheme in the parsing analysis. Further, although several morphemes may appear to be successfully divided initially, it may later turn out that one was incorrectly divided. The parser therefore has the ability to backtrack to any step in the parsing process including backtracking to redivide any previously segmented morpheme. FIG. 2 illustrates such a case.

Depicted therein is an exemplary goal tree illustrating possible states of the above-described Longest Match process. Each node of the tree depicts a possible state of the process after a morpheme is divided from a sentence of characters represented by the characters A through M. The root node 400 of the goal tree represents the state of a sentence with no divided morphemes. The root node 400 has three children nodes 426, 406, 401 showing three possible divisions of the first morpheme from the sentence in accordance with the above stated criteria (caret marks, i.e., "∧", delimit divided morphemes in FIG. 2). Each child node 426, 406, 401 depicts the state of the sentence after the formation of one of three morphemes from the sentence which is both listed in the dictionary and conjunctive with the beginning of a sentence. Thus, "A," "ABC" and "ABCD" are all morphemes listed in the dictionary which are conjunctive with the beginning of a sentence.

As depicted in FIG. 2, of the morphemes that may be formed with the characters A-M which are conjunctive with the beginning of a sentence, "ABCD" is the longest. In the Longest Match process, this would be the first attempted division of the first morpheme. Thus, node 401 depicts the first state of the Longest Match process.

The Longest Match process then proceeds to divide a second morpheme from the characters E-M. As depicted by nodes 402 and 403, only two morphemes may be formed from the characters E-M which are both listed in the dictionary and conjunctive with the first morpheme "ABCD." Again, however, the Longest Match process forms and tests morphemes in the order of decreasing length. Thus, the longer morpheme, "EFGH," would be formed from the remaining characters E-M and successfully tested. This would result in the state as depicted by node 402, with the morphemes "ABCD" and "EFGH" divided from the sentence.

As depicted in FIG. 2, node 402 has no children. This means that no morpheme listed in the dictionary can be formed with the remaining characters I-M or that if morphemes can be formed, they are not conjunctive with the morpheme "EFGH." Hence, the Longest Match parser "backtracks" to the state of node 401. With the state of the Longest Match parser as depicted in node 401 the parser attempts to form a different second morpheme which is conjunctive with "ABCD" from the characters E-M. As depicted in node 403, the next longest morpheme which is conjunctive to "ABCD" is "EF." The Longest Match process thereafter attempts to divide the third and fourth morphemes ("GH," "IJK," respectively) traversing the states of nodes 403 to 405 in a similar manner.

When node 405 is reached, the parser determines that no fifth morpheme may be formed from the remaining characters L and M which is conjunctive with the fourth morpheme "IJK." The parser then backtracks to node 404 to redivide the fourth morpheme from the characters I-M. Since no other morphemes may be formed therefrom which are conjunctive with the morpheme "GH", the parser backtracks to node 403 to redivide the third morpheme from the characters G-M. Since that is not possible, the parser backtracks to node 401 to redivide the second morpheme from the characters E-M. Since, all of the possible morphemes which are conjunctive with "ABCD" have been tried, the parser backtracks to the root node 400 to redivide the first morpheme from the characters A-M. At this point, the first morpheme is redivided as "ABC" as depicted at node 406. It may be appreciated, that processing continues in the above described manner through the numbered nodes in numerical order until node 425 is reached. At this point, all of the morphemes are divided from the sentence.

As can be seen from the goal tree of FIG. 2, the Longest Match process uses very limited criteria to form morphemes. The morphemes are formed in decreasing order of length and then tested to determine if they are conjunctive. Occasionally, however, a morpheme originally thought to be correct, later turns out to be incorrect. At this point, the Longest Match process backtracks to redivide the morphemes of the sentence in the reverse order in which they were divided. As such, the efficiency of the algorithm suffers as many poor choices are selected in the segmentation process which are not discovered until much later on.

The other approach, called the Parse List Method, attempts to more selectively search for the morphemes of the sentence. At each state of the solution, the parser, in this method, determines all of the possible choices for dividing the next morpheme from the remaining characters in the sentence. For instance, using the example of FIG. 2, the parser would first determine that three morphemes "A," "ABC" and "ABCD" could be formed from the characters A-M and are conjunctive with the beginning of the sentence.

Each partial solution is assigned a weight in accordance with some formula for determining the likelihood of segmenting the entire sentence using this particular partial solution. The partial solution that seems best suited to succeed is selected and processing continues on this partial solution. All potential second morphemes are formed from the remaining characters following the first morpheme which are listed in the dictionary and conjunctive with the first morpheme. For instance, assume "ABCD" appeared most likely to lead to a fully segmented sentence. Both "EF" and "EFGH" would be formed and tested. Each new partial solution thereby formed is also assigned a weight. Again, all of the weights of all of the partial solutions are compared and the partial solution which seems best suited to succeed is continued. It may appear, for instance, at this stage, that the first divided morpheme, "ABCD," which previously looked promising will not inevitably lead to a final solution (i.e. a fully segmented sentence). In such a case, the most promising partial solution will be one of the other states having a different first divided morpheme, i.e. the states of nodes 426, 406 of FIG. 2. Thus, the most promising partial solution is continued i.e., all of the choices for the next parsed morpheme of this partial solution will be explored and assigned weights. For example, suppose after comparing the weights of nodes 402, 403, 406 and 426, node 406 appears to have the most promising solution. In such a case, nodes 407, 416 are examined by dividing "D" and "DEF" from the sentence as the second morpheme. This process continues until the final solution is achieved.

The Parse List Method, although theoretically an optimal process, proves to be inadequate in practice. This is because the computation of weights cannot be 100% accurate. Further, at each stage of the morphological process, every potential morpheme of the most promising partial solution must be evaluated and assigned a weight before processing continues. This reduces efficiency by requiring the evaluation of many choices for the next morpheme in a sentence. Finally, the formula which determines the weights for each partial solution may have a significant time requirement to calculate the weight for each partial solution. All of these considerations reduce the efficiency of the algorithm.

It is therefore an object of the present invention to provide a method and system for morphologizing texts which is efficient and reduces the amount of backtracking.

SUMMARY OF THE INVENTION

The present invention is directed to an efficient method and system for morphologizing texts such as Japanese texts. The present invention exploits the connection relationships imposed by the rules of grammar of the language in which the text is written. Illustratively, the connection relationships are implemented using connection codes and connection action codes. For instance, every morpheme in the Japanese dictionary may be assigned a pair or several pairs of connection codes such as depicted in FIG. 3. As depicted in FIG. 3, each pair of codes has a front connection code and a back connection code. For example, the morpheme 1 has the front connection code I and the back connection code 54. The morpheme 2 has the front connection code 199 and the back connection code 138. The front connection code serves to relate the particular morpheme to a prior morpheme in the sentence. Conversely, the back connection code serves to relate the particular morpheme to a subsequent morpheme in a sentence.

All of the permissible morpheme relationships in the Japanese language may be tabulated as depicted in FIG. 4. The table segment shown in FIG. 4 is a partial listing of such a table. Each table entry is cross-referenced by a pair of codes comprising one connection code from each of two adjacent morphemes. The first code is the back connection code of the previous morpheme and the second code is the front connection code of the subsequent morpheme. In addition to storing all of the permissible relationships of morphemes, the table also stores an entry describing the relationship between the two adjacent morphemes called a connection action. As depicted in FIG. 4, each pair of connection codes indexes a connection action code.

The table of FIG. 4 tabulates the rules of grammar which dictate when two morphemes may be placed adjacent to one another. Two morphemes are conjunctive, i.e. may be placed adjacent to one another, only if their respective connection codes are co-indexed in the table of permissible relationships. The contra-positive is also true; if the respective connection codes of two morphemes are not co-indexed in the table of permissible relationships, then the words cannot be placed adjacent to one another. Hence, when two adjacent morphemes are identified, by consulting a table of permissible relationships, one may determine whether the morphemes are placed in accordance with the rules of grammar. Further, one may determine the relationship between the two morphemes by retrieving the connection action entry in the table.

In the operation of the invention, a sentence of characters is segmented or divided into morphemes, one morpheme at a time. Initially, the longest possible substring of characters, which is listed in a dictionary, is divided from the remaining characters in the sentence. Preferably, the longest morpheme is obtained using a "pattern table" which is a graph or tree structure of interconnected character nodes. The pattern table is described in detail below.

The longest obtained morpheme is not necessarily grammatically conjunctive with (i.e., cannot be placed adjacent to) the morphemes previously divided from the sentence and must first be tested. To that end, all pairs of front and back connection codes of this morpheme are illustratively retrieved from a first table. A determination is then made if this morpheme is grammatically conjunctive with the previous morpheme (or the beginning of the sentence if there are no previously divided morphemes in the sentence). This is achieved by consulting a table of permissible relationships or connection action code table using every permutation of one front connection code from each pair of connection codes associated with the untested morpheme and one back connection code selected from each pair associated with the previous morpheme. A default back connection code is supplied if there are no previously divided morphemes in the sentence.

The connection action code entry, indexed by each above-described permutation of connection codes selected from the untested morpheme and the previously divided morpheme, is retrieved from a second table, if present. If a particular front connection code, selected from a pair of codes of the untested morpheme, does not co-index a connection action code in any above-described permutation, the entire pair of codes, from which this particular code was selected, is eliminated. For example, suppose a tested morpheme has three pairs of front and back connection codes (a,b), (c,d) and (e,f) of which "a", "c" and "e" are front connection codes. If "c" does not co-index a connection action code with any back connection code of the previous morpheme the pair (c,d) is eliminated.

If at least one connection action code is present, the morphemes may be conjunctive with one another and form a relationship. If no connection action codes are present for any permutation, the morphemes may not be placed adjacent to one another. This indicates that the above-formed longest morpheme is not correct, and that reformulation of the morpheme is necessary. In such a case, the next to the longest morpheme assembled from the sentence of characters should be formed and tested.

If at any time there are leftover characters at the end of the sentence that do not form a morpheme listed in the dictionary or do not form a conjunctive morpheme (i.e., a morpheme which may be placed adjacent to the previously divided morpheme), backtracking to the previously divided morpheme occurs. In other words, a previously divided morpheme, which was originally thought to be correct, will be redivided. Backtracking may occur at any failed stage of processing in order to "undo" i.e., redivide several previously divided morphemes in the sentence. Once the re-division step is completed, the morphologizing steps continue as before.

If a connection action code is successfully retrieved, meaning that the morpheme may be conjunctive with the previous morphemes, it is recorded and the process repeats itself. In other words, the next morpheme is divided from the remaining characters of the sentence. If particular connection action codes are retrieved then the division of the next morpheme is achieved by forming the next morpheme from the single next remaining character. This procedure, referred to as look ahead processing, illustratively exploits a particular property of Japanese grammar—that a particular single character must follow as the next morpheme in certain contexts.

After all of the morphemes are divided from the sentence, connection actions, associated with each connection action code, are executed. In the execution step, morphemes are placed into a word graph which collocates the morphemes in accordance with the roles they play in the sentence. Knowledge information, associated with each morpheme, is illustratively consulted to assist the construction of the graph. Thereafter, the graphed sentence may be further processed in accordance with a desired application such as translation, understanding, etc.

BRIEF DESCRIPTION OF THE DRAWINGS

FIG. 4 depicts a segment of a table of permissible morpheme relationships.

FIG. 6 depicts a pattern table segment in the form of a tree.

FIG. 7 depicts a format for storing morpheme connection codes and knowledge.

FIG. 8 depicts a connection action code table according to the present invention.

FIG. 9 generally illustrates the connection action codes and respective procedures executed in response thereto by step 118 of FIG. 5.

FIG. 10 depicts the state of selected steps of a sample execution of the morphology process according to the present invention.

FIG. 11 depicts the segmented sentence after the sample execution shown in FIG. 10.

FIG. 12 depicts the state of the segmented sentence shown in FIG. 11 after executing the connection actions.

DESCRIPTION OF THE INVENTION

Figure 1:
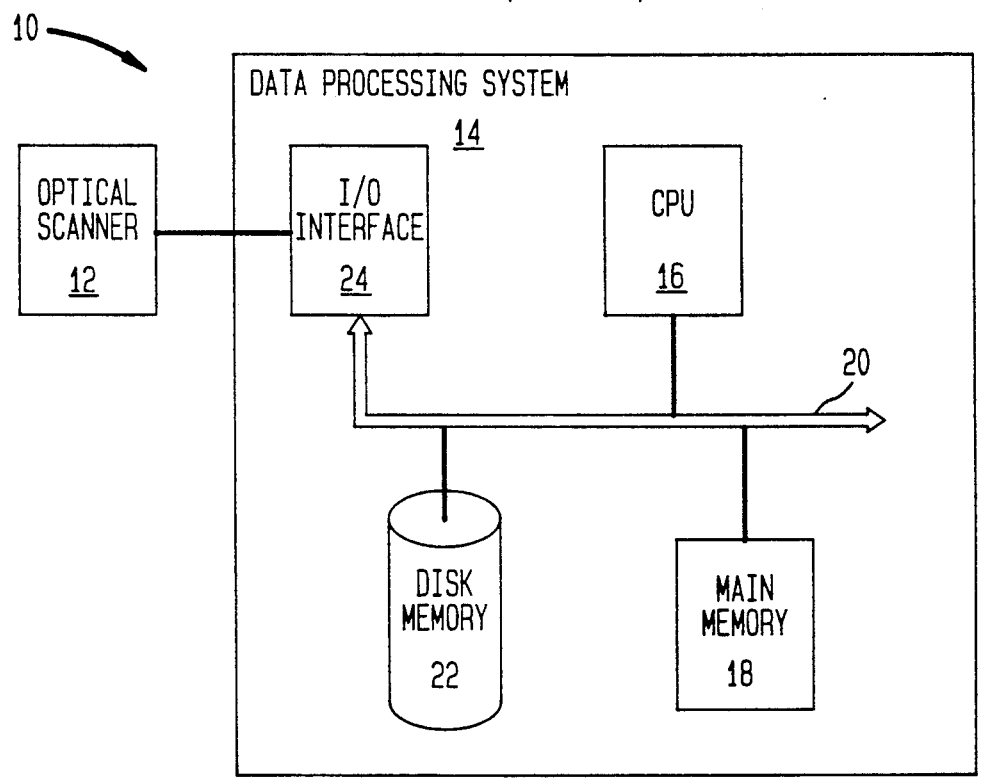
FIG. 1 depicts an optical character recognition (OCR) system.
Figure 2:
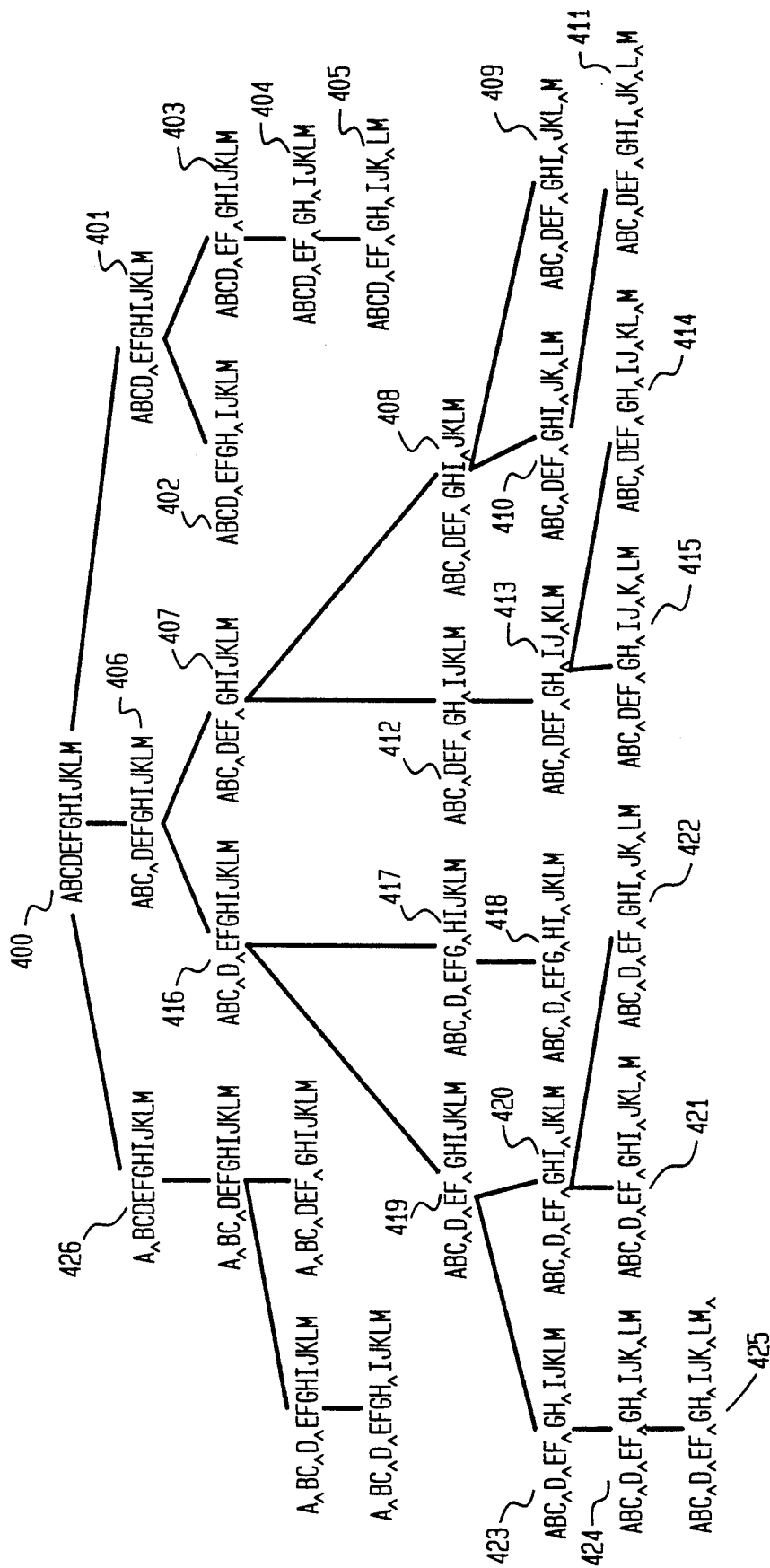
FIG. 2 schematically shows a goal tree depicting the states of a longest match parser.
Figure 3:
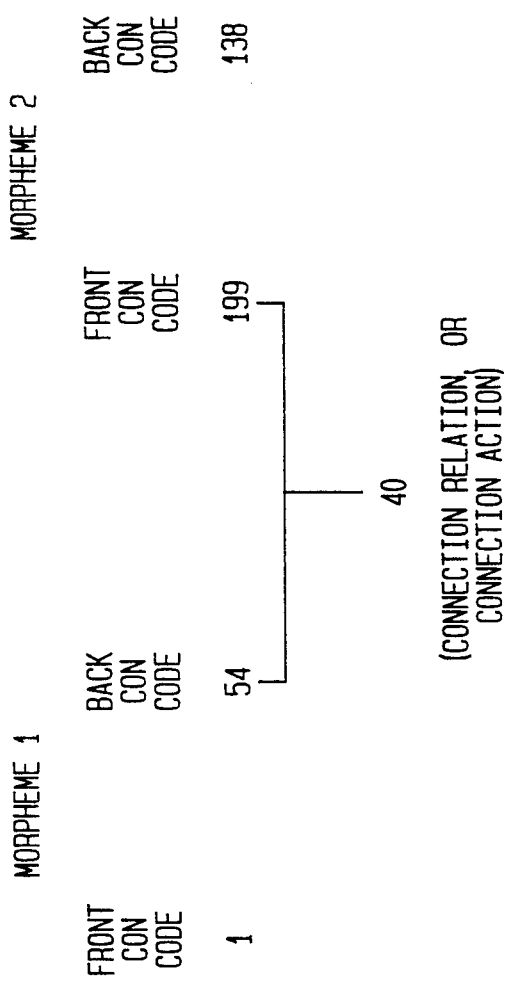
FIG. 3 depicts the relationship of adjacent morphemes, their connection codes, and connection action codes.
Figure 5:
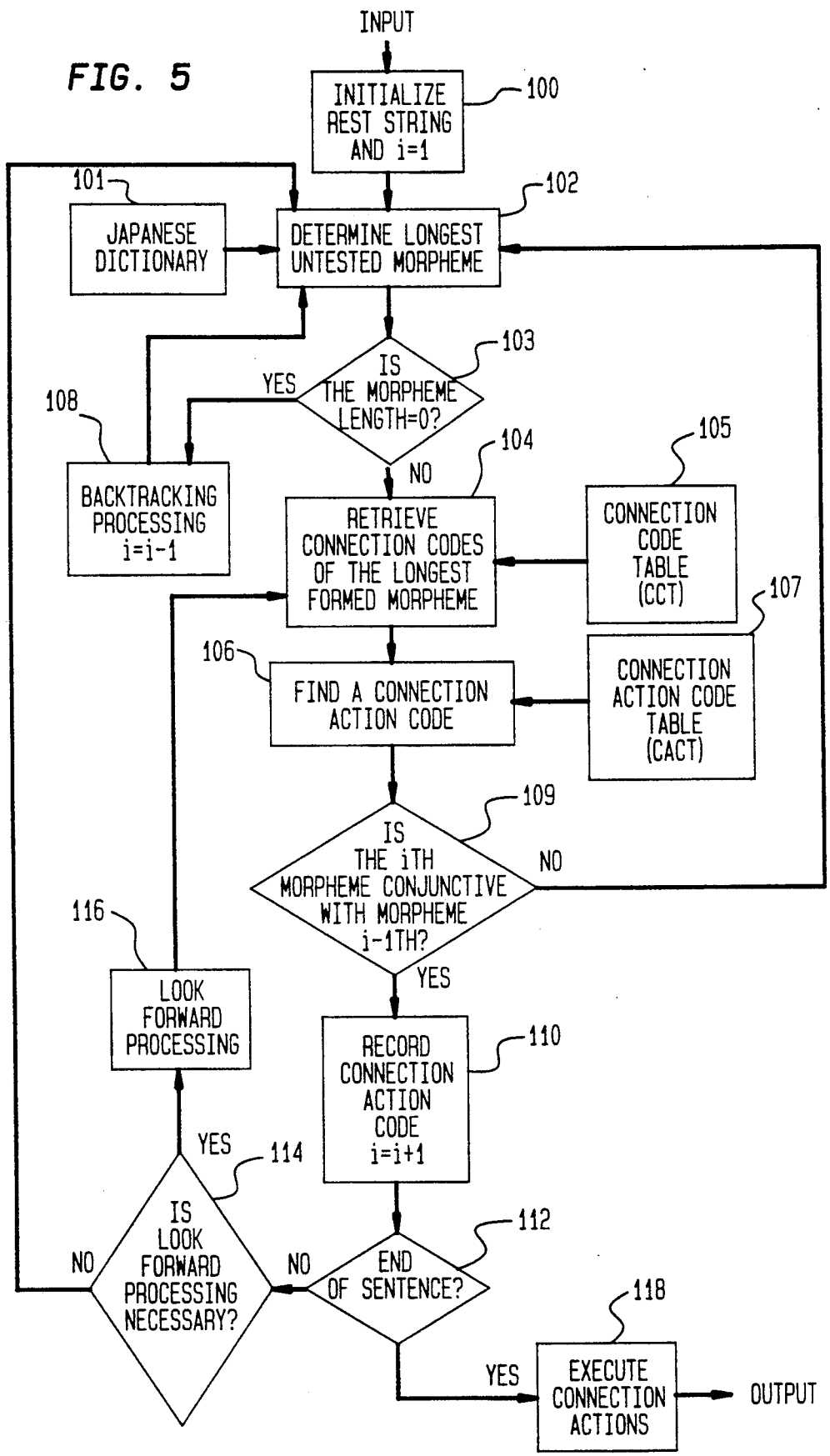
FIG. 5 schematically illustrates a morphology process according to the present invention.

FIG. 5 depicts a flow chart of a program executed by the CPU 16 (FIG. 1). The program may be executed using C language or LISP. Although the execution of the program is described in connection with morphologizing a Japanese text, the method of the present invention is also applicable to other texts such as Korean and Chinese texts.

Initially, execution begins with step 100 where the CpU 16 (FIG. 1) stores a sentence in a variable referred to as rest string. The rest string variable stores the characters of a sentence in the order in which they appear on the scanned document. As morphemes are divided from the sentence, the characters comprised in each divided morpheme are removed from the rest string. Hence, the rest string variable stores the undivided characters remaining in the inputted sentence at any point in the execution of the morphology process. Additionally, in this step 100, the variable i is initialized to one. This variable indicates which morpheme in the sentence is currently being divided.

Execution in the CPU 16 (FIG. 1) then continues with step 102 where the longest series of characters from the rest string are assembled, starting from the first character in the sentence, to form the longest possible morpheme. In this process, a Japanese dictionary 101 is consulted to ensure that only a morpheme which exists in the Japanese language is assembled from the remaining characters. The Japanese dictionary 101 is stored in memory 18 or 22 of FIG. 1. Preferably, to perform this step efficiently, the longest possible morpheme is assembled using the aid of a pattern table as depicted in FIG. 6.

As depicted in FIG. 6, the pattern table 200 comprises several tree data structures and may be stored in memory 18 or 22 (FIG. 1). One tree, for example, the tree 200-1, is provided to store all of the Japanese morphemes that begin with each character of the Japanese character set. Each root node 200-2, therefore, is associated with a unique character of the Japanese character set. The remaining nodes 200-3 to 200-8 of each tree correspond either to other characters or to a morpheme delimiter. Only characters are stored in intermediary nodes 200-3 to 200-5, 200-8 and only morpheme delimiters are stored at terminal nodes 200-6 to 200-7.

Each tree 200-1 is constructed such that a morpheme may be retrieved by traversing any path (e.g., 200-2, 200-3, 200-4, 200-6) within the tree from the root node 200-2 to a terminal node 200-6, 200-7 and recording the character associated with each node visited in the order of the traversal. The CPU 16 (FIG. 1) may compute the longest morpheme that can be formed from the remaining characters in the sentence by traversing the nodes 200-2 to 200-7 of a tree 200-1 corresponding to each character remaining in the sentence as they appear. For instance, the CPU 16 (FIG. 1) first executes a step which selects a tree 200-1 from the pattern table 200 whose root node 200-2 corresponds to the first character of the rest string (i.e., the next undivided character in the sentence). Thereafter, using the CPU 16 (FIG. 1), the tree 200-1 is traversed from the root node 200-2 to the child node 200-3 or 200-5 corresponding to the next character in the rest string (i.e., the second unparsed character). Then, the CPU 16 (FIG. 1) traverses the tree 200-1 from the present child node, e.g., 200-3, to its child, e.g., 200-4, corresponding to the third character in the rest string, and so on. Upon reaching a node 200-2 to 200-7 which has no children nodes corresponding to the next character in the rest string, the CPU 16 (FIG. 1) determines if the current node, e.g., 200-4, has a terminal node, e.g., 200-6, which stores a delimiter. If not, the CPU 16 (FIG. 1) retraces the traversal of the tree in reverse from the current node to the nearest node with a delimiter child (i.e., a terminal) node. The longest morpheme which may be formed from the remaining characters in the sentence comprises the characters associated with each node traversed from the root node to the terminal node in the order of traversal.

As depicted in FIG. 6, the delimiter 200-6 illustratively is an address which points to the location of an entry 305, within a connection code table (CCT) 105 (see FIG. 5) stored in memory 18 or 22 (FIG. 1). This entry 305, shown in greater detail in FIG. 7, contains the connection code pair or pairs 105-1 (FRONT CODE 1, BACK CODE 1), 105-2 (FRONT CODE 2, BACK CODE 2), . . . , 105-N (FRONT CODE N, BACK CODE N) associated with the longest morpheme (constructed by traversing the tree 200-1 of FIG. 6). Some morphemes can play more than one role and hence typically have more than one pair of connection codes. For instance, the morpheme "work" can be a noun or a verb. To accommodate more than one pair of codes the morpheme delimiter 200-6 of the pattern table, preferably points to the location of the first connection code pair 105-1.

Some morphemes have synonyms. Illustratively, all synonymous groups of morphemes have pointers to only one set of pairs, within the CCT 105 (FIG. 5).

As shown in FIG. 7, the other pairs 105-2, . . . , 105-N, are stored in the CCT 105 (FIG. 5) adjacent to the first pair 105-1. Thus, after the CPU 16 (FIG. 1) retrieves the longest formed morpheme from the pattern table, the CPU 16 (FIG. 1) may easily access the CCT 105 (FIG. 5) using the address stored at the terminal node, e.g., 200-6 (FIG. 6). Following the pairs of codes 105-1, 105-2, ..., 105-N is a CCT delimiter 201. As the CPU 16 (FIG. 1) retrieves the pairs 105-1, 105-2, ..., 105-N it scans to see if the CCT delimiter 201 is reached. Upon reaching the CCT delimiter 201, the CpU 16 (FIG. 1) stops retrieving codes.

As shown in FIG. 6, the CCT delimiter 201 (FIG. 7) illustratively points to the location of an entry in a Japanese to Chinese knowledge dictionary 202. Illustratively, the knowledge dictionary is also stored in memory 18 or 22 (FIG. 1). The CPU 16 (FIG. 1) may use the CCT delimiter 201 (FIG. 7) to access the corresponding entry in the knowledge dictionary 202. This is useful if the intended application of the morphology is to translate written Japanese to Chinese. In such a case, the dictionary entry preferably stores important information for collocating the particular morpheme within a word graph after the sentence is segmented.

Referring again to FIG. 5, after the CPU 16 (FIG. 1) computes the longest morpheme in step 102, execution proceeds to step 103 where it is determined if any morpheme at all was retrieved. If no morpheme was retrieved then execution jumps to step 108 where backtrack processing is performed. In step 108, the index i is decremented so that the previously segmented morpheme will be reformed. Control then returns to step 102 where the next longest morpheme is formed and tested to replace this previously segmented morpheme.

If in step 103 the CPU 16 (FIG. 1) determines that a morpheme was formed, execution continues with step 104 where the CPU 16 (FIG. 1) retrieves the connection codes of the longest morpheme from the CCT 105. As mentioned before, the morpheme may have an associated pointer stored therewith in the dictionary 101 or pattern table 200 (FIG. 6) which points to the appropriate pair or pairs of connection codes in the CCT 105. Alternatively, the morpheme is illustratively used as an index in the CCT 105 and the appropriate pair or pairs of connection codes are retrieved.

Each morpheme has at least one pair of connection codes, a front and a back code. Typically, however, each morpheme has more than one pair of codes. In such a case, the CPU 16 (FIG. 1) retrieves all of the codes and test each one in steps 106 and 109 (as discussed below). It is quite possible that several different codes are valid (enable the morpheme to be conjunctive). All of the valid codes are retained while the rest are eliminated.

After at least one connection action code pair is retrieved, execution in the CPU 16 (FIG. 1) continues with step 106 in which the longest morpheme is tested to determine if it is conjunctive with the previously divided morpheme. Since no morpheme is divided prior to the first morpheme, the CPU 16 (FIG. 1) determines whether the longest morpheme is conjunctive with the beginning of the sentence. Illustratively, the CPU uses a pair of default connection codes for the beginning of the sentence.

In the comparison step 106, the CPU 16 (FIG. 1) tests the longest formed morpheme by accessing a connection action code table (CACT) 107 stored in the memory 18 or 22 (FIG. 1) using the connection codes of the longest and previous morphemes. The CPU 16 (FIG. 1) performs one access for each permutation of one front connection code selected from the pairs of connection codes of the longest untested morpheme and one back connection code selected from the pairs of the previous morpheme. Illustratively, a default back connection code is provided if there is no previously divided morpheme.

An exemplary segment 203 of a CACT 107 is depicted in FIG. 8. Illustratively, the CACT segment 203 is divided into two tables 204 and 205 which are stored in memory 18 or 22 (FIG. 1) although a single table could also be used. The first table 20 has three hundred entries each storing three hundred possible back connection codes of morphemes. The first table also stores with each entry the corresponding number of front connection codes of morphemes which are conjunctive to the back connection code of the entry. For instance, a morpheme having a back connection code of 'one' is conjunctive with morphemes having one of eleven particular front connection codes. This is illustrated by table entry 206-1. Similarly, table entry 206-2 indicates that a morpheme with a back connection code of 'two' is conjunctive with a morpheme having one of twelve particular front connection codes. The second table 205 stores all of the front connection codes which may connect with each back connection code in the following manner. Locations zero through ten store the eleven post morpheme front connection codes which may be connected with the previous morpheme back connection code of 'one'. Thereafter, locations eleven to twenty-two store the post morpheme front connection codes which may be connected with the previous morpheme back connection code of 'two' and so on. Thus, in order to compare a pair of front and back connection codes one must know the number of front connection codes that the back connection code may connect with and the offset table entry in table 205.

As shown by FIG. 8, the back connection code of the previous morpheme and the front connection code of the above-formed longest morpheme index a third entry which illustratively is a number from 1 to 59. Each number represents the code of a particular connection action. The connection action is a description of the relationship between two morphemes. If the two connection codes index a connection action code in the CACT 107 (FIG. 5) then the particular indexed connection action describes the relationship between the two morphemes. This means that the two morphemes are conjunctive. If no connection action exists for a pair of connection codes then the two morphemes are not conjunctive by means of this pair of codes. In this manner, as the CPU 16 (FIG. 1) tests the morphemes, the number of connection code pairs associated with the untested morpheme is pruned. For instance, suppose an $i^{th}$ morpheme has five connection code pairs, of which three pairs have a front connection code which relates it to the $i-1^{th}$ morpheme. In this case, the CPU 16 (FIG. 1) prunes or eliminates two pairs of connection codes of the $i^{th}$ morpheme as they do not relate the $i^{th}$ morpheme to its predecessor. On the other hand, suppose that the $i+1^{th}$ morpheme has three pairs of connection codes, none of which have front connection codes which are conjunctive to any of the back connection codes of the three remaining pairs of the $i^{th}$ morpheme In such a case, the CPU 16 (FIG. 1) reforms the $i+1^{th}$ morpheme in the order of decreasing length.

Execution in the CPU 16 (FIG. 1) next proceeds to step 109 where, depending on the success of testing the morpheme, the morpheme will be reformed or the next morpheme will be formed. In the case no connection action is indexed under any above-described permutation of two codes, formed from a back code of a prior morpheme and a front code of a subsequent morpheme, execution in the CPU 16 (FIG. 1) then jumps back to step 102 where a different morpheme is formed from the remaining characters in the sentence. In the reformulation (step 102), the next to longest morpheme may be formed from the remaining characters and tested to determine if it is conjunctive, in the above-described manner, using the CPU 16 (FIG. 1). If, on the other hand, no such conjunctive morpheme may be formed, then backtracking occurs (via steps 103 and 108), i.e., the previously divided morpheme will be redivided (i.e., the next to longest morpheme will be formed and tested from the characters which comprise this morpheme) by the CPU 16 (FIG. 1). In such a case, the CPU 16 (FIG. 1) decrements the morpheme counter i by one and redivides the last divided morpheme. Again, if no such morpheme may be formed then the next previously divided character will be redivided (again, the morpheme counter i being decremented by one), etc. After a new morpheme is formed, execution in the CPU 16 (FIG. 1) otherwise proceeds in a normal fashion as described above.

In the case that the above-described longest morpheme is conjunctive with the previously divided morpheme, execution in the CPU 16 (FIG. 1) continues with step 110. In step 110, the CPU 16 (FIG. 1) records the connection codes of the above-described longest morpheme and the morpheme is considered divided. Additionally, the respective connection action codes which describe the relationship of the longest morpheme to the previous morpheme are also recorded by the CPU 16 (FIG. 1). The variable i, which indicates the number of the next morpheme to be divided, is incremented and the characters which comprise this morpheme are removed from the rest string by the CPU 16 (FIG. 1). Execution in the CPU 16 (FIG. 1) then proceeds with step 112 in which it is determined whether the end of the sentence has been reached. If the end of the sentence has been reached, execution proceeds in the CPU 16 (FIG. 1) to step 118. If not, execution proceeds to step 114.

In step 114 the CPU 16 (FIG. 1) determines if look-ahead processing is necessary. Specifically, in step 114, it is determined if a connection action, which related the current divided morpheme to the previously divided morpheme, was a particular action. Illustratively, in step 114, it is determined whether the corresponding connection action code was 40 and the back connection code of the current divided morpheme is 124, 131, 141-149, 152 or 169. This would indicate that the previously divided morpheme was a word and that the current divided morpheme is a stem. In such a case, the next morpheme must be a leaf having only one character. If the connection action code was 40 and the last divided morpheme has one of the above mentioned back connection codes, execution in the CPU 16 (FIG. 1) illustratively jumps to step 116. Otherwise, execution jumps to step 102 and the CPU 16 (FIG. 1) divides the next morpheme from the remaining characters in the sentence. It may be appreciated that different morphemes may be subsequently formed as the next morpheme depending on which connection codes of the last formed morpheme are used. Preferably, execution proceeds to the look-ahead processing step 114 if any connection action code is 40. Otherwise execution in the CPU 16 (FIG. 1) proceeds to step 102 to form the longest subsequent morpheme which is conjunctive by means of any back connection code of the previous morpheme.

In step 116, the CPU 16 (FIG. 1) forms the next morpheme from the single next character of the remaining characters in the rest string (sentence). This procedure, referred to as look-ahead processing, exploits a natural constraint of the Japanese language—that the morpheme following the sequence of a word followed by a stem must be a leaf (a single character). After forming the next morpheme from the single next character, execution in the CPU 16 (FIG. 1) jumps to step 104 and otherwise proceeds normally. Because in look-ahead processing, the next morpheme to be divided has already been formed, steps 102-103 are skipped.

When the end of the sentence is reached, execution proceeds from step 112 to step 118. In step 118, the CPU 16 (FIG. 1) constructs a word graph using the connection actions and the knowledge information associated with each morpheme. To achieve this end, the CPU 16 (FIG. 1) executes procedures associated with each connection action code. FIG. 9 depicts a generalized table of connection action codes, and a brief description of the procedure executed in accordance with the connection action codes. After all of the connection action codes are executed, the graphed sentence is outputted by the CPU 16 (FIG. 1) from the data processing system 14 (FIG. 1).

A sample segmentation of a Japanese sentence will now be described with reference to FIGS. 5 and 10. Depicted in FIG. 10 is a table showing the state of the morphology after the CPU 16 (FIG. 1) executes a particular step of FIG. 5. The first column of the table represents the value of the variable i and describes which morpheme is currently being divided. The second column represents the step of FIG. 5 which was executed by the CPU 16 (FIG. 1) to place the morphology in the state of that particular line. The third column displays the current morpheme that is in the process of being divided. The fourth column shows the connection codes of the morpheme currently being divided. The fifth column displays the connection action code which relates the current morpheme to the previous morpheme and the final column displays the rest string after each step is executed. For purposes of brevity, the details of the longest match step 102 are not shown.

Initially, in step 100, a sentence of characters is read in and stored in the rest string. The morpheme counter, i, is initialized to one and the beginning of the sentence (represented by the "<" character) is assigned the default pair of connection codes (i.e., front connection code, "2" and back connection code "269"). Next, step 102 is executed until the longest possible morpheme that may be extracted from the rest string is retrieved. Since a morpheme is formed (step 103), step 104 is executed and the connection code pair (i.e., front connection code "1" and back connection code "54") is retrieved for the first formed morpheme. Next, step 106 is executed to determine if this morpheme is conjunctive with the beginning of the sentence. Since the pair (269, 1) index the connection action code 10, the morpheme is conjunctive with the beginning of the sentence. Thus, in steps 109-114, the connection action, 10, is recorded, the morpheme counter i is incremented and execution proceeds back to step 102 where the next morpheme is divided from the remaining characters in the sentence.

As can be seen from FIG. 10, morphemes two through four each comprise two characters and respectively have the connection code pairs, (1, 74), (205, 164), (1, 54). Morphemes two through four are respectively connected by the connection actions corresponding to codes 10, 30 and 44. Similarly, as each morpheme is determined, the characters remaining in the rest string are reduced.

Finally, the eighth morpheme is formed. A determination is made that the eighth morpheme is connected to the seventh morpheme by the connection action corresponding to code 40. Further, the back connection code of the eighth morpheme is 148. Thus, look-ahead processing is enabled in step 116. The ninth morpheme is formed from the single next character of the rest string. Thereafter, execution proceeds immediately to step 104 where the connection codes (142, 137) are retrieved from the CCT for the ninth morpheme. It is then determined, in step 106 that the ninth morpheme is connected to the eighth morpheme by the connection action corresponding to code 30.

Referring now to FIG. 13, an exemplary table is depicted showing the results of the execution by the CPU 16 (FIG. 1) over an entire sentence prior to executing step 118 of FIG. 5. The first column displays the number of each morpheme. The second column displays the segmented morpheme. The third column displays the connection action code relating the morpheme of that particular line of the table to the previous morpheme. Finally, the last column displays the connection code pair of each morpheme.

In step 118 of FIG. 5, procedures, generally described in FIG. 9, are executed, and a knowledge dictionary consulted, to construct a word graph. Generally, the execution of connection action codes involves deleting morphemes associated with certain action codes. For instance, each morpheme connected by connection action code 30 is deleted. FIG. 12 illustrates the results of the execution the connection actions on the data of FIG. 11. The first and second columns are as before. The third column displays the role each morpheme plays in the sentence and the fourth column displays useful information which relates the morphemes. The data of table 13 may then be outputted for further processing such as executing computer functions as instructed by the inputted sentence or translating the written sentence to another language.

Finally, the above-mentioned embodiment is intended merely to illustrate the invention. Numerous other embodiments may be envisioned by those skilled in the art without departing from the spirit of the following claims.

We claim:

1. A method of morphologizing a sequence of characters into morphemes of a sentence in a data processing system having a CPU and memory comprising the step of:
   in the CPU, electronically dividing each morpheme of a sequence of morphemes, one at a time from the beginning of the sequence, said dividing step including the steps of, from a subsequence of remaining undivided characters of said sequence of characters beginning with a first character of said sequence of undivided characters, if said morpheme is a first morpheme of said sequence of morphemes, otherwise beginning with a first character immediately following a previously divided morpheme, electronically forming a morpheme which is grammatically conjunctive with the beginning of the sentence, if said morpheme is said first morpheme, otherwise with a previously divided morpheme of said sequence of morphemes, and, if necessary, to form said grammatically conjunctive morpheme, electronically redividing a previously divided morpheme, said forming step comprising the steps of:
   in the CPU, electronically identifying a longest untested morpheme, from said subsequence of remaining undivided characters, which is also listed in a dictionary stored in memory;
   in the CPU, retrieving from said memory at least one pair of front and back connection codes associated with said longest untested morpheme from a first table;
   in the CPU, retrieving one action code, from a second table stored in memory, indexed by each combination of one front connection code of said longest untested morpheme and, if said morpheme is said first morpheme, a default back connection code is supplied, otherwise, one back connection code of said previously divided morpheme retrieved from said memory, and electronically eliminating, from said longest untested morpheme, all pairs of connection codes for which said CPU fails to retrieve any action codes; and
   if the CPU fails to retrieve any action codes, , electronically redividing said longest morpheme in the CPU.

2. The method of claim 1 further comprising:
   in the CPU, electronically deleting particular morphemes in response to certain connection action codes.

3. The method of claim 1 further comprising:
   if particular action codes are retrieved by the CPU for a particular morpheme, electronically dividing a next morpheme succeeding said particular morpheme by electronically forming said next morpheme with a single character following said particular morpheme.

4. The method of claim 1 wherein said step of identifying the longest untested morpheme comprises using a dictionary having one tree for storing all of the morphemes beginning with each character, each of said trees having interconnected non-terminal nodes associated with one character and terminal nodes associated with delimiters such that a traversal of a path of said tree, from the root of said tree to any terminal node, spells a morpheme, wherein said identifying step further comprises:
   in the CPU, electronically selecting a tree whose root node is associated with said first character of said sequence of characters, if said longest untested morpheme is said first morpheme of said sequence of morphemes, otherwise, with said first character immediately following a previously divided morpheme;
   in the CPU, until a node is reached devoid of children nodes associated with the next character of said subsequence of remaining undivided characters, electronically traversing said selected tree to a child node associated with said next character of said subsequence of remaining undivided characters; and
   in the CPU, electronically retracing said traversal of said selected tree to the nearest node having a terminal node and electronically forming said longest untested morpheme from the characters associated with each node traversed from said root to said terminal node, in order.

5. The method of claim 4 wherein said delimiter points to the location in said first table of said front and back connection code pairs associated with said longest untested morpheme.

6. A method for morphologizing, in a data processing system having a CPU and a memory, the characters of a sentence into morphemes comprising the step of:
- in the CPU, electronically dividing each morpheme of a sequence of morphemes, one at a time from the beginning of the sentence, by electronically forming a morpheme from a sequence of remaining undivided characters of the sentence beginning with a first character of said sequence of undivided characters, if said morpheme is a first morpheme of said sequence of morphemes, otherwise beginning with a first character immediately following a previously divided morpheme, which is grammatically conjunctive with the beginning of the sentence, if said morpheme is said first morpheme, beginning otherwise with a previously divided morpheme of said sequence of morphemes and, if necessary to form said grammatically conjunctive morpheme, by electronically redividing a previously divided morpheme, said forming step comparing the steps of:
  - (a) in the CPU, electronically identifying a longest untested morpheme of the sentence from said sequence of remaining undivided characters of the sentence which is listed in a dictionary stored in memory;
  - (b) in the CPU, electronically retrieving at least one pair of front and back connection codes of said longest untested morpheme from a first table stored in memory;
  - (c) in the CPU, electronically testing said longest untested morpheme by retrieving one action code, from a second table stored in memory, indexed by each combination of one front connection code of said longest untested morpheme and, if said morpheme is said first morpheme, a default back connection code is supplied otherwise, one back connection code of said previously divided morpheme retrieved from said memory, and electronically eliminating, from said longest untested morpheme, all pairs of connection codes for which said CPU fails to retrieve any action codes;
  - (d) if said CPU fails to retrieve any action codes from said second table in step (c), returning to step (a);
  - (e) if a particular one of said action codes is retrieved from said second table, electronically forming a next morpheme from a single character of said sequence of remaining undivided characters following said morpheme for which said particular action code was retrieved and returning to step (b); and
  - (f) until the end of the sentence is reached by the CPU, returning to step (a).

7. The method of claim 6 wherein said method is used for translating Japanese to Chinese and further comprises:
- in the CPU, electronically replacing said morphemes with Chinese morphemes using a Japanese to Chinese knowledge dictionary stored in memory.

8. The method of claim 6 wherein said step of identifying the longest untested morpheme comprises using a dictionary having one or more trees for storing all of the morphemes beginning with each character, each of said trees having interconnected non-terminal nodes associated with one character and terminal nodes associated with delimiters such that a traversal of a path of said trees, from the root of said tree to any terminal node, spells a morpheme, wherein said identifying step further comprises:
- in the CPU, electronically selecting a tree whose root node is associated with said first character of said sequence of characters, if said longest untested morpheme is said first morpheme of said sequence of morphemes, otherwise, with said first character immediately following a previously divided morpheme,;
- in the CPU, until a node is reached devoid of children nodes associated with the next character of said sequence of remaining undivided characters in said sentence, electronically traversing said selected tree to a child node associated with the next character of said sequence of remaining undivided characters in said sentence; and
- in the CPU, electronically retracing said traversal of said selected tree to the nearest node having a terminal node and electronically forming said longest untested morpheme from the characters associated with each node traversed from said root to said terminal node, in order.

9. The method of claim 6 wherein said delimiter points to the location in said first table of said front and back connection code pairs associated with said longest untested morpheme.

10. A text processing system comprising:
- an optical scanner for generating a scanned sequence of characters;
- a data processing system connected to said optical scanner for receiving and for morphologizing said scanned sequence of characters, said data processing system comprising:
  - a memory for storing a dictionary of valid morphemes, a first table of connection code pairs containing front and back connection codes associated with each morpheme and a second table of connection action codes corresponding to a back connection code of a preceding morpheme and a front connection code of a subsequent morpheme for every valid adjacent placement of preceding and subsequent morphemes;
  - a CPU, connected to said memory, for receiving each sequence of characters, for dividing a sequence of morphemes of a sentence, one at a time from the beginning of said sequence, by forming a longest morpheme from a sequence of remaining characters of one of said received sequences of characters beginning with a first character if said morphemes is a first morpheme of said sequence of morphemes, otherwise, beginning with a first character immediately following a previously divided morpheme which is both listed in said dictionary and conjunctive with the beginning of the sentence, if said morpheme is said first morpheme, otherwise, beginning with said previously divided morpheme, by redividing a previously divided morpheme if necessary to form said conjunctive morpheme and by testing each formed morpheme by retrieving one or more pairs of front and back connection codes associated with said longest morpheme from said first table stored in memory, retrieving one connection action code, from said second table stored in memory, indexed by each combination of one front connection code of said longest morpheme and, if said morpheme is said first morpheme, a default back connection code is supplied, otherwise, one back connection code of said previously divided morpheme retrieved from said memory, eliminating all connection code pairs, from said longest morpheme, for which said CPU fails to retrieve any action codes, redividing said longest morpheme if said CPU fails to retrieve any action codes and, if particular action codes are retrieved, dividing a next morpheme by forming said next morpheme with a single character following said morpheme for which one from said particular action codes was retrieved of said sequence of remaining characters and testing said morpheme.

* * * * *